(12) United States Patent
Dria et al.

(10) Patent No.: US 8,776,609 B2
(45) Date of Patent: Jul. 15, 2014

(54) USE OF FIBER OPTICS TO MONITOR CEMENT QUALITY

(75) Inventors: Dennis Edward Dria, Houston, TX (US); Jeremiah Glen Pearce, Houston, TX (US); Frederick Henry Rambow, Houston, TX (US); David Ralph Stewart, Richmond, TX (US)

(73) Assignee: Shell Oil Company, Houston, TX (US)

( * ) Notice: Subject to any disclaimer, the term of this patent is extended or adjusted under 35 U.S.C. 154(b) by 106 days.

(21) Appl. No.: 13/389,136

(22) PCT Filed: Aug. 4, 2010

(86) PCT No.: PCT/US2010/044379
§ 371 (c)(1),
(2), (4) Date: Feb. 6, 2012

(87) PCT Pub. No.: WO2011/017413
PCT Pub. Date: Feb. 10, 2011

(65) Prior Publication Data
US 2012/0132007 A1    May 31, 2012

Related U.S. Application Data

(60) Provisional application No. 61/231,411, filed on Aug. 5, 2009.

(51) Int. Cl.
| G01B 5/30 | (2006.01) |
| G01B 7/16 | (2006.01) |
| G01L 1/00 | (2006.01) |
| E21B 47/00 | (2012.01) |
| E21B 47/10 | (2012.01) |
| G01B 11/16 | (2006.01) |
| E21B 47/08 | (2012.01) |

(52) U.S. Cl.
CPC ............ G01B 11/18 (2013.01); E21B 47/0005 (2013.01); E21B 47/10 (2013.01); E21B 47/0006 (2013.01); E21B 47/08 (2013.01)
USPC .............................................. 73/760; 73/781

(58) Field of Classification Search
USPC .................................................. 73/760, 781
See application file for complete search history.

(56) References Cited

U.S. PATENT DOCUMENTS

| 6,854,327 | B2 | 2/2005 | Rambow et al. |
| 7,121,342 | B2 * | 10/2006 | Vinegar et al. ................ 166/302 |
| 7,245,791 | B2 | 7/2007 | Rambow |
| 7,357,180 | B2 * | 4/2008 | Vinegar et al. ............. 166/254.1 |
| 7,360,588 | B2 * | 4/2008 | Vinegar et al. ................. 166/59 |
| 7,409,858 | B2 | 8/2008 | Dria et al. |
| 8,025,445 | B2 * | 9/2011 | Rambow et al. ................ 385/95 |
| 2004/0129424 | A1 * | 7/2004 | Hosie et al. ................ 166/332.8 |
| 2005/0051327 | A1 * | 3/2005 | Vinegar et al. ................ 166/256 |
| 2007/0056383 | A1 * | 3/2007 | Deeg .............................. 73/788 |

(Continued)

FOREIGN PATENT DOCUMENTS

| WO | 2004085797 A1 | 10/2004 |
| WO | 2006116122 A2 | 11/2006 |
| WO | 2007111642 A2 | 10/2007 |
| WO | 2009032881 A1 | 3/2009 |

*Primary Examiner* — Lisa Caputo
*Assistant Examiner* — Jamel Williams (57) ABSTRACT

Systems and methods for monitoring a well are configured to identify or analyze various issues affecting the well including corrosion, cement quality, inflow, and fluid migration.

8 Claims, 10 Drawing Sheets

(56) References Cited

U.S. PATENT DOCUMENTS

| | | | |
|---|---|---|---|
| 2007/0131411 A1* | 6/2007 | Vinegar et al. | 166/59 |
| 2007/0132605 A1 | 6/2007 | Beique et al. | 340/854.3 |
| 2007/0289741 A1* | 12/2007 | Rambow | 166/250.01 |
| 2008/0047662 A1 | 2/2008 | Dria et al. | |
| 2009/0296086 A1* | 12/2009 | Appel et al. | 356/326 |
| 2010/0303427 A1* | 12/2010 | Rambow et al. | 385/95 |
| 2012/0155508 A1* | 6/2012 | Dria et al. | 374/107 |
| 2013/0336612 A1* | 12/2013 | Pearce | 385/12 |

* cited by examiner

USE OF FIBER OPTICS TO MONITOR CEMENT QUALITY

PRIORITY CLAIM

The present application is a national filing under 35 USC §371 of PCT/US2010/044379, filed 4 Aug. 2010, which claims priority from U.S. Provisional Applications 61/231, 411, filed 5 Aug. 2009, both of which are incorporated by reference.

TECHNICAL FIELD

This invention relates generally to systems and methods for monitoring a well.

BACKGROUND

Monitoring the state of a well and the state of the surrounding formation remains difficult. Information about the state of the well and the state of the formation is useful, for example, to detect issues at an early stage where changes in operation can be made and remedial action can be implemented to prevent partial or complete loss of a well.

SUMMARY

The present disclosure provides systems and methods for monitoring a well. The systems and methods are configured to identify or analyze various issues affecting the well including corrosion, cement quality, and fluid migration. One advantage of systems and methods that are described herein is the ability to continuously monitor a well. Another advantage is that systems and methods monitor more area of a well and with greater resolution. The systems and methods also simplify certain operations.

According to an exemplary embodiment, a method for monitoring corrosion of a casing of a well includes measuring internal pressure of the casing, measuring strain of the casing with a system comprising at least one string of interconnected sensors that is arranged such that the sensors are distributed along a length and the circumference of the casing, and determining the thickness of the casing as a function of internal pressure and strain. A system configured to monitor corrosion of a casing of a well includes a pump configured to control internal pressure of the casing, a gauge configured to measure internal pressure of the casing, at least one string of interconnected sensors that is arranged such that the sensors are distributed along the length and circumference of the casing and configured to measure strain of the casing, and a computing unit configured to receive measurements of internal pressure and strain and to determine thickness of the casing as a function of internal pressure and strain.

According to another exemplary embodiment, a method for analyzing cement in the annulus of a well includes controlling internal pressure of a casing of the well, measuring internal pressure of the casing, measuring strain of the casing with a system comprising at least one string of interconnected sensors that is arranged such that the sensors are distributed along a length and the circumference of the casing, the measured strain being a function of internal pressure, and determining the quality of the cement as a function of strain of the casing and internal pressure. Another method for analyzing cement in a well annulus includes measuring strain of a casing in the well with a system including at least one string of interconnected sensors that is arranged such that the sensors are distributed along a length and the circumference of the casing, and, after pumping cement into the well annulus, establishing a baseline that is a function of steady state strain measurements within a first time period, and identifying strain measurements that substantially deviate from the baseline during a second time period.

According to another exemplary embodiment, a method for identifying fluid migration or inflow associated with a wellbore tubular includes measuring strain of the wellbore tubular with a system comprising at least one string of interconnected sensors that is arranged such that the sensors are distributed along a length and the circumference of the wellbore tubular, establishing a baseline that is a function of steady state strain measurements within a first time period, and identifying fluid migration or inflow where strain measurements substantially deviate from the baseline within a second time period.

According to yet another exemplary embodiment, a method for analyzing fluid proximate an injection well includes turning an injector on or off, determining temperature along a casing of the well during a first time period, and associating a rate of temperature change during the first time period with a fluid.

The foregoing has broadly outlined some of the aspects and features of the present disclosure, which should be construed to be merely illustrative of various applications of the teachings. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION

As required, detailed embodiments are disclosed herein. It must be understood that the disclosed embodiments are merely exemplary of the teachings that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

For purposes of teaching, the systems and methods of this disclosure will be described in the context of monitoring a well, wellbore tubular, and the surrounding formation. However, the teachings of the present disclosure are also useful in other environments, such as to monitor pipes and the surrounding environment in refineries, gas plants, pipelines, and the like.

As used herein, a wellbore tubular is a cylindrical element of a well. Wellbore tubulars to which the systems and methods can be applied include a well casing, a non-perforated tubular, a perforated tubular, a drill pipe, a joint, a production tube, a casing tube, a tubular screen, a sand screen, a gravel pack screen, combinations thereof, and the like. The wellbore tubular can be formed from steel or other materials.

Figure 1:
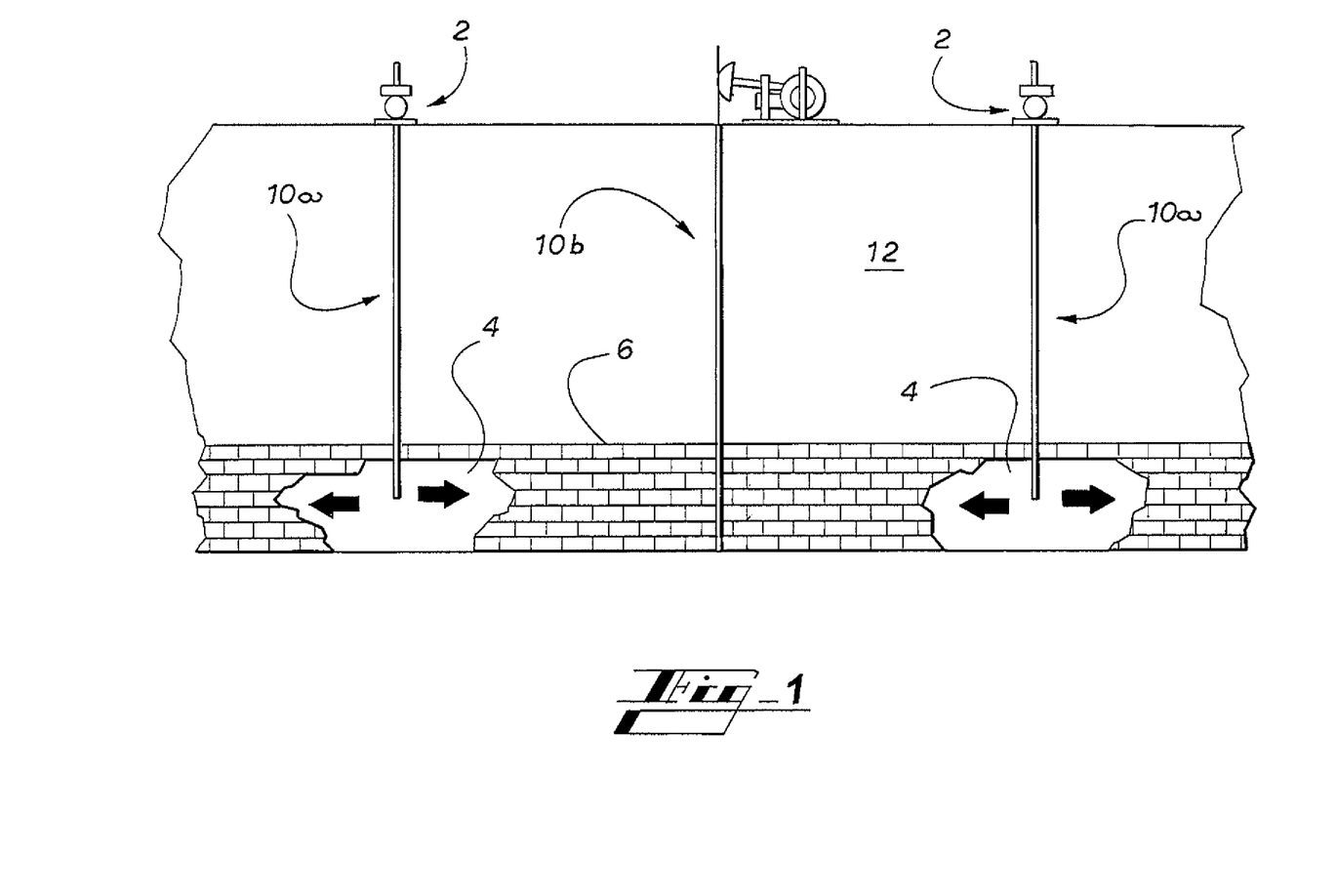
FIG. 1 is a schematic illustration of an exemplary injection operation.

The systems and methods are configured to monitor the wellbore tubular during production or non-production operations including injection, depletion, completion, cementing, gravel packing, frac packing, production, stimulation, water-flood, a gas miscible process, inert gas injection, carbon dioxide flood, a water-alternating-gas process, liquefied petroleum gas drive, chemical flood, thermal recovery, cyclic steam injection, steam flood, fire flood, forward combustion, dry combustion, well testing, productivity test, potential test, tubing pressure, casing pressure, bottomhole pressure, down-draw, combinations thereof, and the like. An exemplary injection operation is illustrated in FIG. 1. Here, injection wells 10a include injectors or fluid pumps 2 that inject fluid 4 into a permeable bed 6 of a formation 12 to drive oil toward a production well 10b.

The systems and methods are configured to investigate downhole well problems such as those indicated by changes in production. Such problems include crossflow, premature breakthrough, casing leaks, fluid migration, corrosion, tubing leaks, packer leaks, channeled cement, other problems with cement quality, blast joint leaks, thief zones, combinations thereof, and the like. The systems and methods facilitate identifying the points or intervals of fluid entry/exit, the flow rate at such points, the type of fluid at such points, and the origin of the fluids coming into the well. The systems and methods are further configured to investigate the integrity of a well as part of a routine maintenance operation.

Herein, a suffix (a, b, c, etc.) or subscript (1, 2, 3, etc.) is affixed to an element numeral that references like elements in a general manner so as to differentiate a specific one of the like elements. For example, strain string $22a$ is a specific one of strain strings 22.

Figures 2, 3:
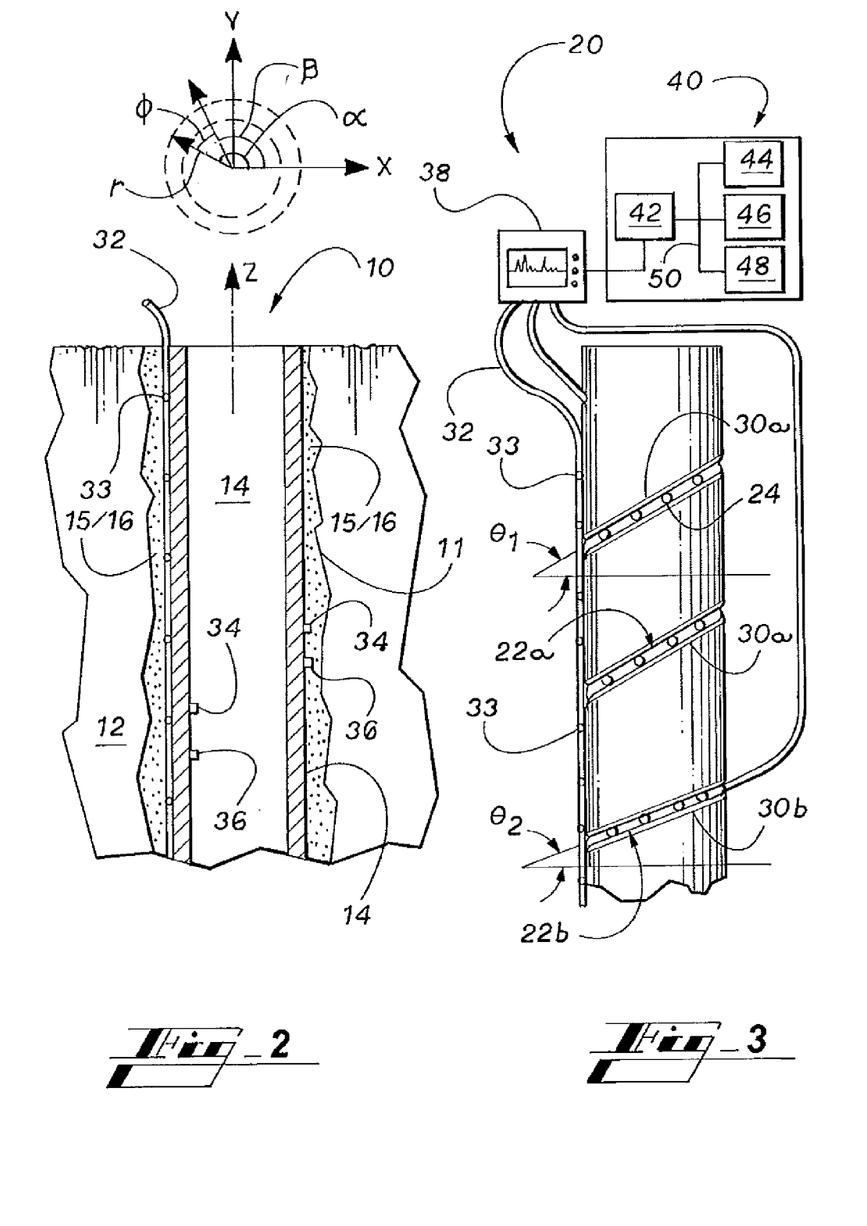
FIG. 2 is a partial cross-sectional view of a well reinforced with a casing according to an exemplary embodiment.
FIG. 3 is a partial elevational view of the casing of FIG. 2 and a monitoring system according to an exemplary embodiment.
Figure 15:
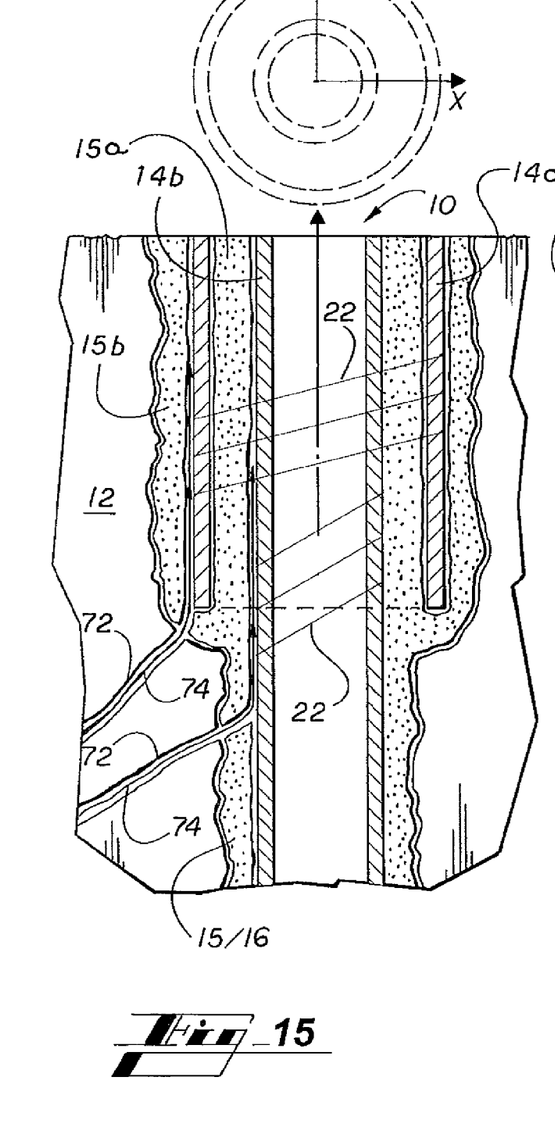
FIG. 15 is a partial cross-sectional view of a well reinforced with concentric casings illustrating exemplary flows moving along the outside of the outermost casing and between the casings.

Referring to FIG. 2, a well 10 includes a borehole 11 that is drilled in a formation 12. To prevent well 10 from collapsing or to otherwise line or reinforce well 10, well 10 includes a string of casings 14 that are inserted and cemented in borehole 11. Cement 16 is pumped up an annulus 15 between casing 14 and the wall of borehole 11 to provide bonded cement sheath 16 that secures casing 14 in borehole 11. Alternatively, well 10 may be formed according to other methods. Referring momentarily to FIG. 15, string of casings 14 includes concentric casings $14a$, $14b$.

Continuing with FIG. 2, for purposes of teaching, coordinate systems are now described. A Cartesian coordinate system can be used that includes an x-axis, a y-axis, and a z-axis that are orthogonal to one another. The z-axis corresponds to the longitudinal axis of casing 14 and any position on casing 14 can be established according to an axial position z and a position in the x-y plane, which is perpendicular to the z-axis. In the illustrated embodiment, casing 14 is cylindrical and any position on casing 14 can be established using a Cylindrical coordinate system. Here, the z-axis is the same as that of the Cartesian coordinate system and a position lying in the x-y plane is represented by a radius r and a position angle $\alpha$ and referred to as a radial position $r\alpha$. Radius r defines a distance of the radial position $r\alpha$ from the z-axis and extends in a direction determined by position angle $\alpha$ to the radial position $r\alpha$. Here, position angle $\alpha$ is measured from the x-axis. A bending direction represents the direction of a bending moment on casing 14. The bending direction is represented by a bending angle $\beta$ that is measured relative to the x-axis. A reference angle $\phi$ is measured between bending angle $\beta$ and position angle $\alpha$.

Monitoring System

Referring now to FIGS. 2 and 3, a monitoring system 20 is configured to monitor casing 14 and formation 12. Monitoring system 20 includes strain strings 22 that include interconnected sensors 24. Strain strings 22 are wrapped around casing 14 so as to position sensors 24 along the axial length and circumference of casing 14. As such, strain strings 22 are integral to well 10 and configured to measure strain of casing 14 at a range of azimuth angles and a range of depth locations. Grooves 30 are formed in casing 14 and strain strings 22 are recessed in grooves 30. In alternative embodiments, strain strings 22 are deployed on the inside of casing 14 and may be permanently or temporarily attached. Strings 22 can be laminated to casing 14 or pressed against casing 14 by a covering or expandable layer of material.

In the illustrated embodiments, monitoring system 20 includes a plurality of strain strings $22a$, $22b$ and each strain string $22a$, $22b$ winds substantially helically at least partially along the length of casing 14. Strain strings $22a$, $22b$ are arranged at different constant inclinations that are hereinafter referred to as wrap angles $\theta_1$, $\theta_2$. Illustrated wrap angles $\theta_1$, $\theta_2$ are measured with respect to x-y planes although equivalent alternative formulations can be achieved by changing the reference plane. In alternative embodiments, strings include a series of segments that are arranged at different inclinations so as not to intersect one another.

In general, wrapping strain strings 22 at wrap angle $\theta$ is beneficial in that strain strings 22 experience a fraction of the strain experienced by casing 14. Additionally, each wrap angle $\theta_1$, $\theta_2$ is effective for a range of strain and the use of multiple strain strings 22a, 22b with different wrap angles $\theta_1$, $\theta_2$ expands the overall range of strain that monitoring system 20 can measure. For example, strain string 22 with wrap angle $\theta$ of 20° may fail at one level of strain while strain string with wrap angle $\theta$ of 30° or more may not fail at the same level of strain or at a slightly higher level of strain. The use different wrap angles $\theta$ also facilitates determining unknown parameters, as described in further detail below. Another advantage of wrapping casing 14 with multiple strain strings 22a, 22b is that there is added redundancy in case of failure of one of strain strings 22. The additional data collected with multiple strain strings 22 makes recovery of a 3-D image an overdetermined problem thereby improving the quality of the image.

Referring again to FIG. 15 where casings 14a, 14b are concentric, strain strings 22 are wrapped around each of concentric casings 14a, 14b. Such an arrangement is useful in certain applications, as described in further detail below. Otherwise, strain strings 22 are generally wrapped around outermost casing 14a as geomechanical deformations are best transferred to outermost casing 14a from formation 12. Alternatively, strain strings 22 can be coupled to outermost casing 14a by cementing, centralization, or other movement limiters.

Continuing with FIGS. 2 and 3, monitoring system 20 includes a temperature string 32 of sensors 33. As such, monitoring system 20 is configured to operate as a distributed temperature sensing (DTS) system. Illustrated temperature string 32 is positioned against casing 14 and configured to take temperature measurements along the length of casing 14 and independently of strain strings 22. Alternatively, temperature string 32 can be wrapped around casing 14 as described above with respect to strain strings 22. Temperature strings 32 and strain strings 22 are used in combination according to certain exemplary methods as described in further detail below.

Monitoring system 20 further includes single point pressure gauges 34 and temperature gauges 36 that are positioned to measure pressure and temperature independently of strain strings 22 and temperature strings 32. For example, internal pressure from fluid levels and well head annular pressure is measured with a pressure gauge 34 that is positioned inside casing 14. Alternatively, other independent means of measuring or calculating temperature and pressure can be used.

Monitoring system 20 further includes a data acquisition unit 38 and a computing unit 40. Illustrated data acquisition unit 38 collects the response of each of strain strings 22, temperature strings 32, and single point gauges 34, 36. The response and/or data representative thereof are provided to computing unit 40 to be processed. Computing unit 40 includes computer components including a data acquisition unit interface 42, an operator interface 44, a processor unit 46, a memory 48 for storing information, and a bus 50 that couples various system components including memory 48 to processor unit 46.

Strain Strings

Strain strings 22 are now described in further detail. There are many different suitable types of strain strings 22 that can be associated with monitoring system 20. For example, strain strings 22 can be waveguides such as optical fibers and sensors 24 can be wavelength-specific reflectors such as periodically written fiber Bragg gratings (FBG). An advantage of optical fibers with periodically written fiber Bragg gratings is that fiber Bragg gratings are less sensitive to vibration or heat and consequently are more reliable. In alternative embodiments, sensors 24 can be other types of gratings, semiconductor strain gages, piezoresistors, foil gages, mechanical strain gages, combinations thereof, and the like. For purposes of illustration, according to a first exemplary embodiment described herein, strain strings 22 are optical fibers and sensors 24 are fiber Bragg gratings.

Figure 4:
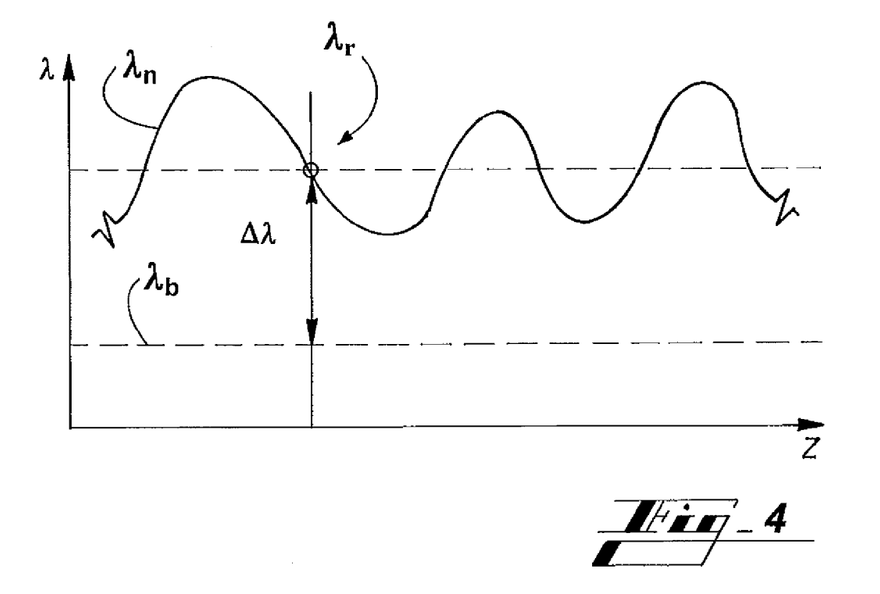
FIG. 4 is a graphical illustration of an exemplary response of a strain string of the monitoring system of FIG. 3.
Figure 5:
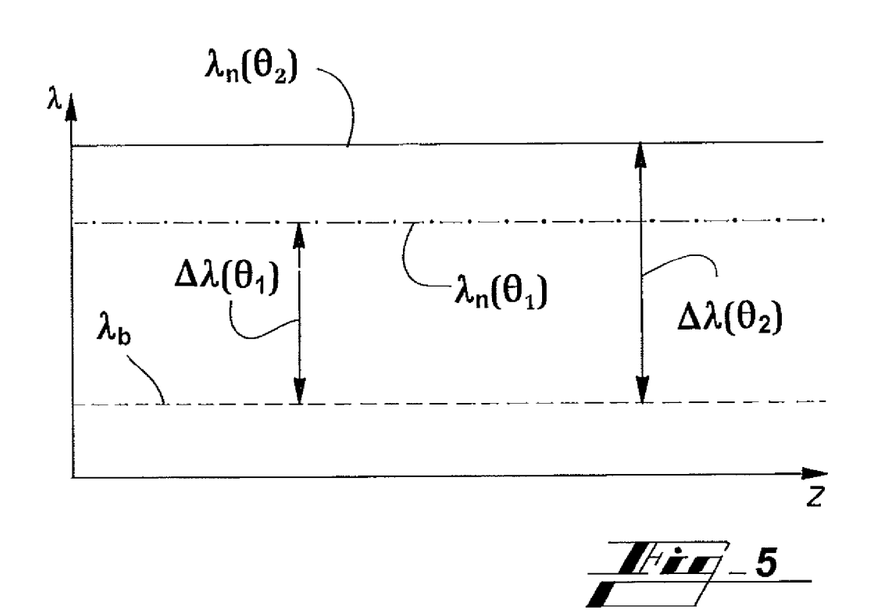
FIG. 5 is a graphical illustration of an exemplary response of strain strings of the monitoring system of FIG. 3.

Referring to FIGS. 4 and 5, a wavelength response $\lambda_n$ of strain string 22 is data representing reflected wavelengths $\lambda_r$ at sensors 24. The reflected wavelengths $\lambda_r$ each represent a fiber strain $\epsilon_f$ measurement at a sensor 24. Here, wavelength responses $\lambda_n$ are plotted with respect to axial positions z of sensors 24 or along the longitudinal axis of casing 14.

Generally described, reflected wavelength $\lambda_r$ is substantially equal to a Bragg wavelength $\lambda_b$ plus a change in wavelength $\Delta\lambda$. Reflected wavelength $\lambda_r$ is equal to Bragg wavelength $\lambda_b$ when fiber strain $\epsilon_f$ measurement is substantially zero and, when fiber strain $\epsilon_f$ measurement is non-zero, reflected wavelength $\lambda_r$ differs from Bragg wavelength $\lambda_b$. The difference is change in wavelength $\Delta\lambda$ and thus change in wavelength $\Delta\lambda$ is the part of reflected wavelength $\lambda_r$ that is associated with fiber strain $\epsilon_f$. Bragg wavelength $\lambda_b$ provides a reference from which change in wavelength $\Delta\lambda$ is measured at each of sensors 24. The relationship between change in wavelength $\Delta\lambda$ and fiber strain $\epsilon_f$ is described in further detail below.

Fiber strain $\epsilon_f$ may be due to forces including axial forces, shear forces, ovalization forces, and compaction forces. Such forces may be exerted, for example, by formation 12, by the inflow of fluid between formation 12 and casing 14, and by a pressure difference across the wall of casing 14. Fiber strain $\epsilon_f$ also may be due to changes in temperature. Referring to FIGS. 4 and 5, fiber strain $\epsilon_f$ due to such forces and changes in temperature can have both a constant (DC) component and sinusoidal (AC) components. Referring to FIG. 5, axial forces, temperature changes, and pressure differences across the wall of the casing 14 are observed in the constant component (wavelength response $\lambda_n$ that is observed as a constant (DC) shift from Bragg wavelength $\lambda_b$). Here, the different constant components correspond to different strain strings 22a, 22b wrapped at different wrap angles $\theta_1$, $\theta_2$. Referring to FIG. 4, bending of casing 14 at a radius of curvature R or ovalization of casing 14 due to hoop forces are observed in the sinusoidal component.

Relationship Between Change in Wavelength and Strain

An equation that may be used to relate change in wavelength $\Delta\lambda$ and fiber strain $\epsilon_f$ imposed on sensors 24 is given by $\Delta\lambda = \lambda_b(1-PE)K\epsilon_f$. As an example, Bragg wavelength $\lambda_b$ may be approximately 1560 nanometers. The term $(1-P_e)$ is a fiber response which, for example, may be 0.8. $P_e$ is a photoelastic coefficient. Bonding coefficient K represents the bond of sensor 24 to casing 14 and, for example, may be 0.9 or greater.

Relationships Between Fiber Strain and Axial Strain, Hoop Strain, Temperature, and Pressure The constant component of measured fiber strain $\epsilon_f$ is related to axial strain $\epsilon_a$ and hoop strain $\epsilon_h$ of casing 14 according to:

$$\epsilon_f = K \cdot (-1 + \sqrt{\sin(\theta)^2 \cdot (1-\epsilon_a)^2 + \cos(\theta)^2 \cdot (1+\nu\epsilon_a)^2}) \text{ and}$$

$$\epsilon_f = K \cdot (-1 + \sqrt{\sin(\theta)^2 \cdot (1-\nu\epsilon_h)^2 + \cos(\theta)^2 \cdot (1+\epsilon_h)^2})$$

where K is the bonding coefficient of the fiber to the tubular, $\theta$ is wrap angle, and $\nu$ is Poisson's ratio. The constant component of measured fiber strain $\epsilon_f$ is a function of the difference between the internal pressure $P_i$ and the external pressure $P_o$ of casing 14 that is given in terms of hoop strain $\epsilon_h$ by:

$$\varepsilon_h \approx \frac{(P_i - P_o)D}{2wE}$$

where D is inner diameter of casing 14, w is wall thickness, and E is Young's modulus of the casing material. The constant component of measured fiber strain $\epsilon_f$ is further a function of change in temperature given by:

$$\epsilon_f \rho \Delta T$$

where $\rho$ is the coefficient of thermal expansion.

Where bending is present, fiber strain $\epsilon_f$ may be associated with axial strain $\epsilon_a$ at a sensor 24 position on casing 14 according to:

$$\varepsilon_f = -1 + \sqrt{\sin^2\theta \cdot \left(1 - \left(\varepsilon_a - \frac{r\cos\phi}{R}\right)\right)^2 + \cos^2\theta \cdot \left(1 + \nu\left(\varepsilon_a - \frac{r\cos\phi}{R}\right)\right)^2}.$$

Here, fiber strain $\epsilon_f$ measured by sensor 24 at a position on casing 14 is a function of axial strain $\epsilon_a$ at the position, radius of curvature R at the position, Poisson's ratio $\nu$, wrap angle $\theta$, and radial position which is represented in the equation by radius r and reference angle $\phi$. Fiber strain $\epsilon_f$ is measured, wrap angle $\theta$ is known, and radius r is known. Poisson's ratio $\nu$ is typically known for elastic deformation of casing 14 and unknown for non-elastic deformation of casing 14. Radius of curvature R, reference angle $\theta$, and axial strain $\epsilon_a$ are typically unknown and are determined through analysis of wavelength response $\lambda_n$. Similarly, Poisson's ratio $\nu$ can be determined through analysis of wavelength response $\lambda_n$ where Poisson's ratio $\nu$ is unknown.

In general, signal processing can be used along with the equations to determine axial strain $\epsilon_a$, radius of curvature R, reference angle $\phi$, Poisson's ratio $\nu$, hoop strain $\epsilon_h$, temperature T (relative to calibrated temperature), internal pressure $P_i$, and external pressure $P_o$ from fiber strain $\epsilon_f$ measured along the length and circumference of casing 14. Examples of applicable signal processing techniques include deconvolution and inversion where a misfit is minimized and turbo boosting. Using the constant component of fiber strain $\epsilon_f$, signal processing can be used to determine pressure and temperature profiles along the length of casing 14. The pressure and temperature profiles provide information that is useful for monitoring casing 14 and formation 12. In general, thermal strains and strain due to fluid pressure changes are much less than geomechanical strain due to the formation 12.

Exemplary monitoring methods that are used during operations such as injection, depletion, completion (cement curing), and the like are described below. In addition, exemplary monitoring methods that are used to detect features such as corrosion, flow or leaks, fluid migration, and the like are described below.

Corrosion Monitoring

Referring to FIGS. 3 and 6-8, exemplary methods of monitoring corrosion with monitoring system 20 are now described. Using a modified version of an equation introduced above, wall thickness w of casing 14 can be determined according to:

$$w = \frac{(P_i - P_e)D}{2\varepsilon_h E}.$$

Figures 6, 7:
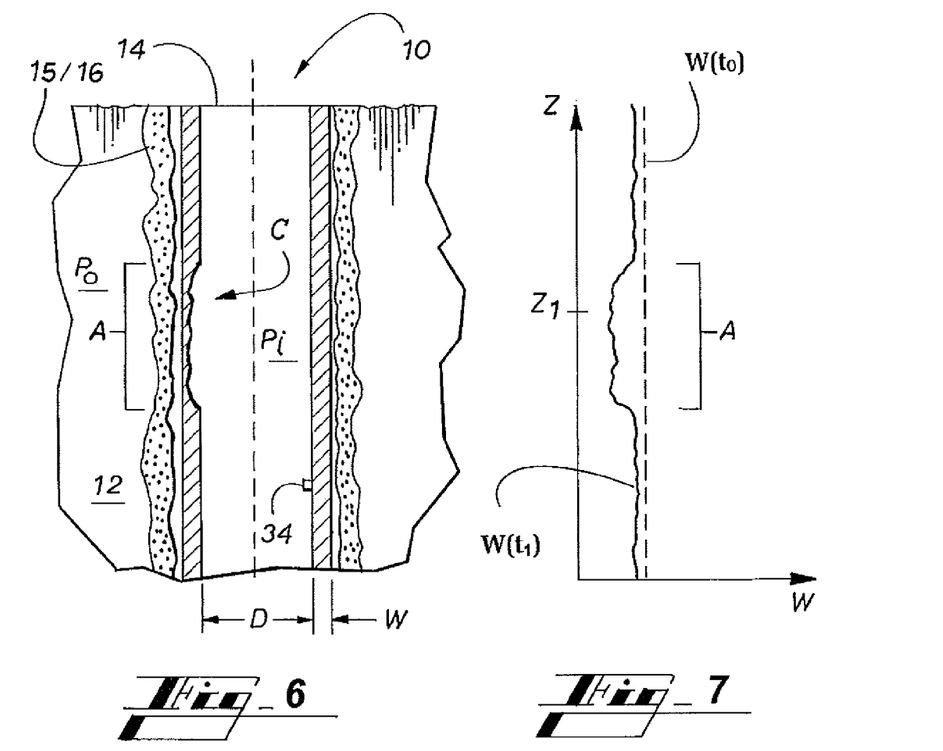
FIG. 6 is a partial cross-sectional view of the casing of FIG. 2 including a corroded area.
FIG. 7 is a graphical illustration of thickness along the length of the casing of FIG. 6.
Figure 8:
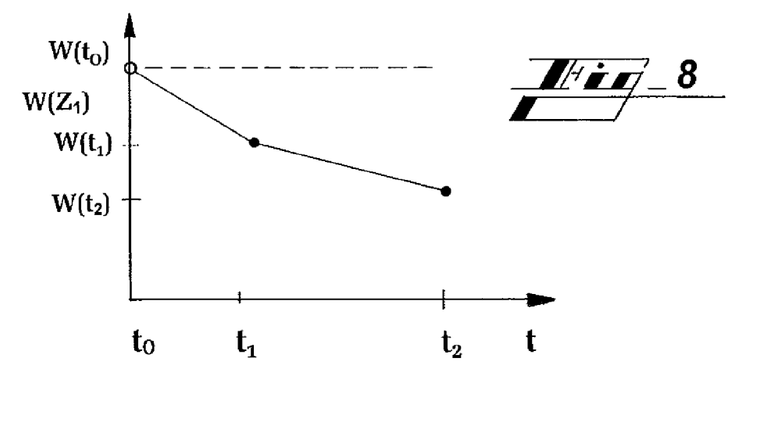
FIG. 8 is a graphical illustration of thickness at a point on the casing of FIG. 6 at different times.

As decrease in thickness w reflects corrosion, casing 14 can be monitored for corrosion by monitoring the thickness w of casing 14 over time or with respect to the original thickness w. For example, the thickness w calculated at some point in time $t_1$, $t_2$ can be compared to the original thickness $w(t_0)$ of casing 14 (or to a previously calculated thickness w or some other baseline thickness) to determine how much corrosion has taken place and the rate of corrosion. Corrosion may be internal, external, or both. In FIG. 6, corrosion C is illustrated in an area A and the corresponding thickness w that is determined from fiber strain $\epsilon_f$ measurement is shown in FIG. 7. Multiple calculations of thickness w at a point $z_1$ in area A at different times $t_1$, $t_2$ are shown in FIG. 8 to illustrate the rate of corrosion.

According to an exemplary method, internal pressure $P_i$ is controlled with a fluid pump 2 (see FIG. 1) as well 10 is shut-in. Internal pressure $P_i$ is measured with internal pressure gauge 34, the diameter D and Young's modulus E of casing 14 are known, and hoop strain $\epsilon_h$ is determined from fiber strain $\epsilon_f$ measured with the strain strings 22 of monitoring system 20. Here, thickness w and external pressure $P_o$ are unknown parameters that are found using the thickness equation along with measurements of internal pressure $P_i$ and hoop strain $\epsilon_h$. Multiple measurements of hoop strain $\epsilon_f$ are utilized to be able to determine both external pressure $P_o$ and thickness w with the equation. For example, multiple measurements of hoop strain $\epsilon_h$ can be determined for each of multiple internal pressures $P_i$. Where internal pressure $P_i$ is can be determined along casing 14 and strain strings 22 make hoop strain $\epsilon_h$ measurements along casing 14, thickness w can be found along the length and around the circumference of casing 14 all at once. As another example, multiple measurements of hoop strain $\epsilon_h$ can be determined by multiple strain strings 22 at different wrap angles $\theta_1$, $\theta_2$.

Alternatively, using an external pressure gauge 34, an independent measurement of external pressure $P_o$ can be combined with a measurement of each of internal pressure $P_i$ and hoop strain $\epsilon_h$ to calculate thickness w at the position of the pressure gauge 34 or along casing 14 where external pressure $P_o$ along casing 14 is constant or calculable using one or more point measurements of external pressure $P_o$.

According to yet another method, where annulus 15 is uncemented and there is access to annulus 15 at the wellhead, internal and external pressures $P_i$, $P_o$ are held constant such that hoop strain $\epsilon_h$ and thickness w are inversely proportional to one another. Here, the following equation can be used to relate hoop strain $\epsilon_h$ and thickness w at two different times $t_1$, $t_2$:

$$w_2 = \frac{w_1 \cdot \varepsilon_{h1}}{\varepsilon_{h2}}.$$

Cement Quality Analysis

Figure 9:
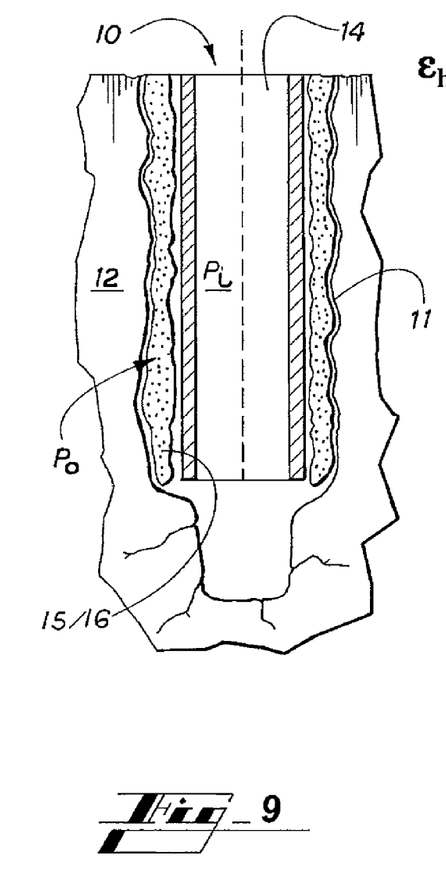
FIG. 9 is a partial cross-sectional view of the casing of FIG. 2 that is undergoing a minifrac treatment.
Figure 10:
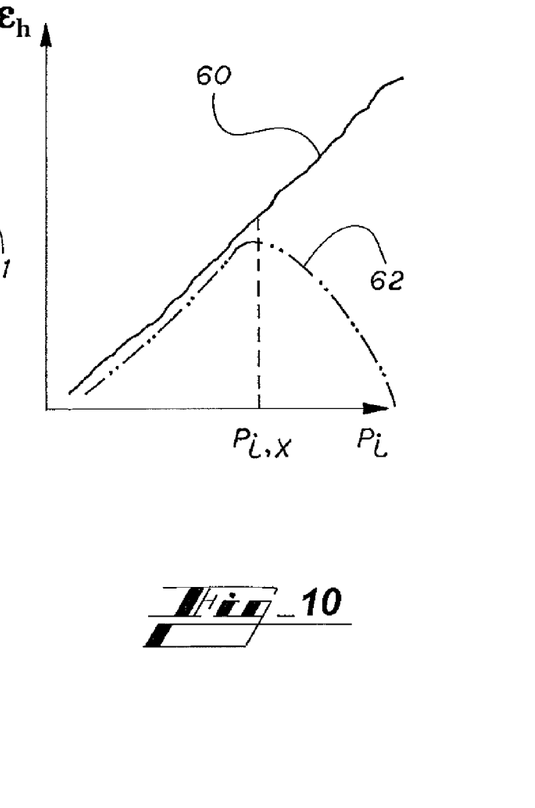
FIG. 10 is a graphical illustration of strain and internal pressure of the casing of FIG. 9.

Referring to FIGS. 9 and 10, an exemplary method of monitoring the quality of cement 16 with monitoring system 20 during a minifrac, leak-off, or formation integrity test is now described. As used herein, a minifrac treatment is a fracturing treatment performed before a main hydraulic fracturing treatment to acquire data and confirm a predicted response. In a formation integrity test, internal pressure $P_i$ is increased to a preset value that is less than the anticipated formation break-down test. The formation integrity test can be used as a cement integrity test. In a leak-off test, internal pressure $P_i$ is increased until part of formation 12 that is exposed to open borehole 11 starts to break down. During each of these tests, internal pressure $P_i$ is increased and fluid may seep into formation 12 if formation 12 has sufficient permeability.

In general, an extended leak-off test or minifrac operation can be used to determine the mechanical properties of formation 12. The mechanical properties can be determined with information gained from the leak-off test or minifrac operation. For example, such information includes limit pressure, leak-off pressure, fracture opening pressure, uncontrolled fracture pressure, fracture propagation pressure, instantaneous shut-in pressure, fracture closure pressure, stable fracture propagation, unstable fracture propagation, fracture closure phase, and backflow phase. A pressure response curve is typically plotted to get such information. The pressure response curve is internal pressure $P_i$ versus time or cumulative volume of fluid pumped.

Monitoring system 20 is used to monitor cement 16 during the extended leak-off test or minifrac operation to facilitate differentiation between fracture of cement 16 and fracture of formation 12. For example, such a differentiation may be difficult to determine from a pressure response curve. As internal pressure $P_i$ increases, fiber strain $\varepsilon_f$ is monitored to determine the quality of cement 16. Referring to FIG. 10, if cement 16 is and remains competent, hoop strain $\varepsilon_h$ is and remains substantially proportional to internal pressure $P_i$, moving along line 60, and external pressure $P_o$ remains substantially constant. If cement 16 is weak and breaks apart or if channels or other fluid pathways exist in cement-filled annulus 15, hoop strain $\varepsilon_h$ will deviate from the line of proportionality 60 with respect to internal pressure $P_i$. For example, hoop strain $\varepsilon_h$ will move along line 62 so as to deviate from line 60 above a certain internal pressure $P_{i,x}$. Here, where such deviation occurs along line 62, hoop strain $\varepsilon_h$ decreases as external pressure $P_o$ changes toward the value of internal pressure $P_i$.

Certain information that is determined from the pressure response curve can similarly be determined from the pressure strain curve shown in FIG. 10. For example, where cement 16 is competent, uncontrolled fracture pressure of formation 12 or the point at which stable fracture growth ends can be identified as the highest internal pressure $P_i$ measured. In such a case, measurements move up and then back down line of proportionality 60 during a leak-off test.

Fluid Monitoring

Referring to FIGS. 11-18, exemplary methods of detecting the presence of fluid, fluid migration, and inflow proximate well 10 are now described. Such monitoring methods can be used to investigate operations such as injection, depletion, production, and the like.

Figure 11:
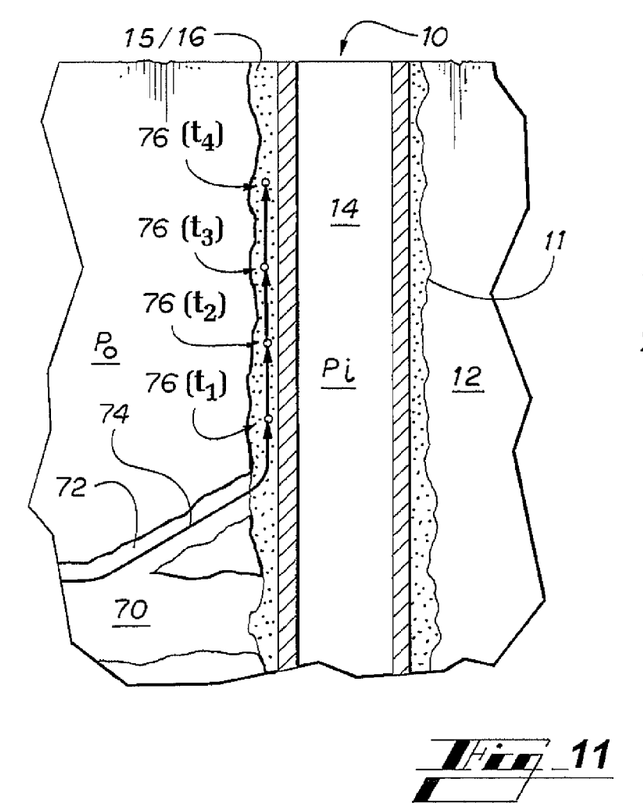
FIG. 11 is a partial cross-sectional view of the casing of FIG. 2 illustrating flow migration along the outside of the casing.
Figure 12:
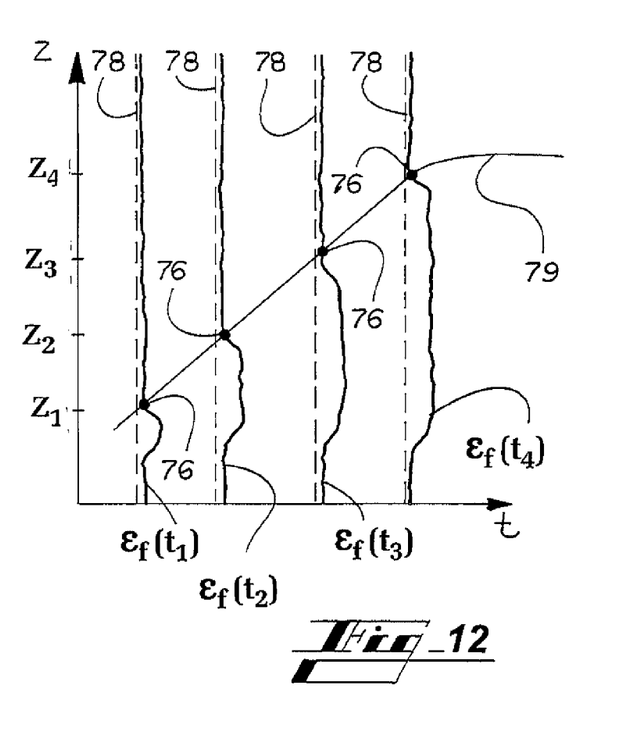
FIG. 12 is a graphical illustration of strain over time along the length of the casing of FIG. 11.

Referring to FIGS. 11 and 12, pressure difference across the wall of casing 14 changes where fluid 74 migrates in formation 12 or annulus 15 along the outside of the wall of casing 14. Fluid may flow from a perforated area or leak in casing 14. The fluid may additionally or alternatively flow from a permeable bed 70 or fracture 72 as shown in FIG. 11. The pressure change in permeable bed 70 may either be negative from a reservoir undergoing depletion or positive from a reservoir undergoing injection of fluids for purposes such as waste or carbon dioxide disposal or water flooding for oil production.

Referring to FIG. 11, permeable bed 70 is undergoing a pressure change and fluid 74 changes the external pressure $P_o$ applied to casing 14 and the associated fiber strain $\varepsilon_f$ response. Referring to FIG. 12, fluid pressure and migration can be identified by deviation of fiber strain $\varepsilon_f$ from a baseline 78 and extension of the deviating measurements along casing 14. Baseline 78 can be determined from measurements of fiber strain $\varepsilon_f$ that are substantially constant or steady-state for a certain time period. The time period used to determine baseline 78 is generally distinct from the time period in which fluid 74 changes external pressure $P_o$.

Illustrated fluid 74 migrates up annulus 15 with the front end boundary 76 of fluid 74 reaching different positions $z_1$, $z_2$, $z_3$, $z_4$ along the length of casing 14 at different times $t_1$, $t_2$, $t_3$, $t_4$. The extent, direction, and rate of fluid 74 migration can be determined by monitoring boundaries 76 of fluid 74 over time and space. As shown in FIG. 12, boundaries 76 can be identified where fiber strain $\varepsilon_f$ measurement deviates from baseline 78. The extent of fluid 74 is the position of front end boundary 76 or the distance between front and rear end boundaries 76, the flow rate is the change in position of front end boundary 76 over time, and the flow direction is given by the change in position of the front end boundary 76. Front end boundary 76 is tracked with line 79. An independent pressure gauge can facilitate determining the direction of pressure migration and the location (inside or outside). Referring to the time greater than time $t_4$ of FIG. 12, front end boundary 76 does not move and the flow rate approaches zero. This is illustrated by the flattening of line 79 and can indicate that fluid 74 is trapped. In other words, fluid 74 with a rate that approaches zero can indicate that fluid 74 is trapped.

Strain strings 22 can further be used to determine the location of fluid 74 where fluid 74 changes the temperature of casing 14 so as to expand or contract the casing 14 and change fiber strain $\varepsilon_f$. For example, temperature changes can be measured by strain strings 22 where flow rate is substantially high and where significant Joule-Thompson effects are involved.

Figure 13:
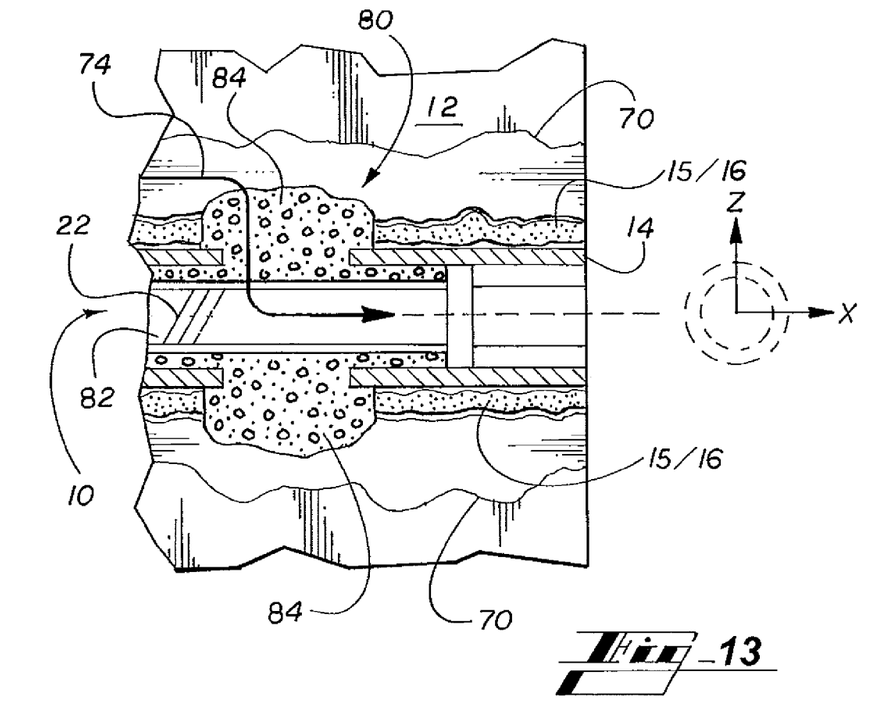
FIG. 13 is a graphical illustration of a horizontal gravel pack according to an exemplary embodiment.
Figure 14:
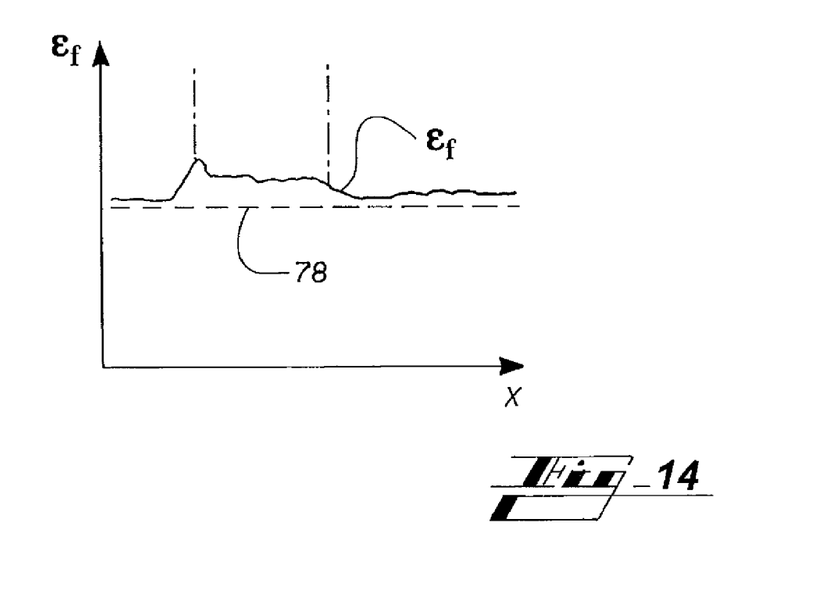
FIG. 14 is a graphical illustration of strain of a gravel pack screen of the gravel pack of FIG. 13.

Similarly, referring to FIGS. 13 and 14, flow through a gravel pack 80, including gravel pack screen 82 and gravel 84, can be monitored where strain strings 22 are wrapped around a gravel pack screen 82. Here, the inflow of fluid 74 changes the temperature of gravel pack screen 82 to create thermal strain such that the measurement of fiber strain $\varepsilon_f$ deviates from baseline 78. Greater fiber strain $\varepsilon_f$ deviation can indicate point of entry into gravel pack screen 82.

Figure 16:
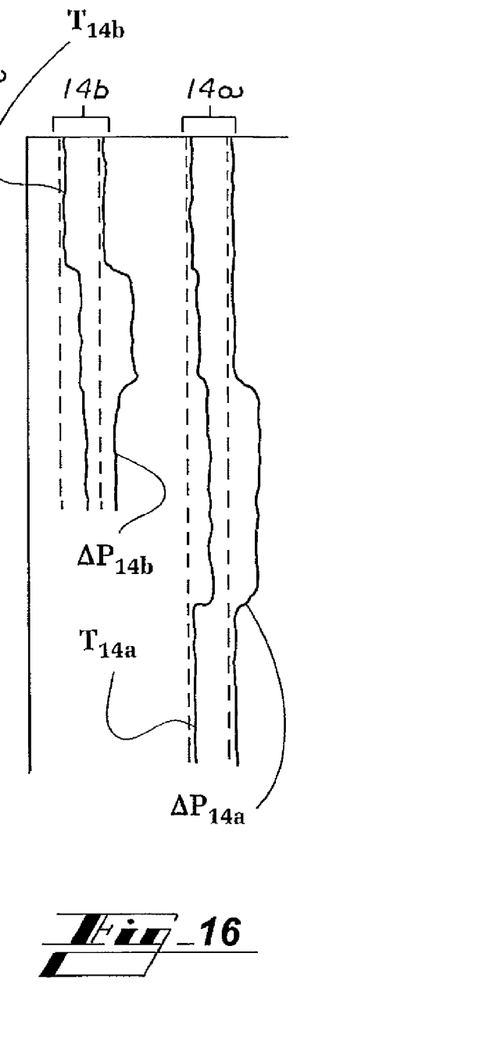
FIG. 16 is a graphical illustration of pressure difference and temperature corresponding to strain strings on each of the concentric casings of FIG. 15.

Referring to FIGS. 15 and 16, flow detection with a monitoring system 20 including strain strings 22 on concentric casings 14a, 14b is described. FIG. 15 shows fluid 74 migrating up annulus 15a between outer casing 14a and inner casing 14b as well as up annulus 15b between outer casing 14a and the wall of borehole 11. Here, the material in annulus 15a, 15b may be permeable or fluid 74 may move through a microannulus, channel, or void. As used herein, the term microannulus refers to the space between cement 16 and wall of casing 14 or wall of borehole 11. A fluid migration detection method is similar to the methods described above. Here, the responses of strain strings 22 on concentric casings 14a, 14b can be compared to determine the location, rate, and direction of flow. Referring to FIG. 16, the change in pressure difference $\Delta P (P_i - P_o)$ and the change in temperature T on each of casings 14a, 14b is illustrated. The changes in temperature T and pressure difference $\Delta P$ are reflected in fiber strain $\epsilon_f$ measurements as previously described. In general, flow that is closer to one of casings 14a, 14b will have a greater effect on the pressure and temperature components of fiber strain $\epsilon_f$ of that casing 14a, 14b. Also, radial flow may be indicated by inversely proportional responses of strain strings 22 on concentric casings 14a, 14b.

The responses of strain strings 22 and temperature string 32 are used together to determine where the flow is located or the size of the flow. In general, larger and closer flows result in greater temperature and pressure responses while smaller and farther flows result in lesser temperature and pressure responses. Strain strings 22 are more sensitive to flow at a greater distance from casing 14 than temperature string 32. For example, if strain string 22 response shows a pressure increase and the temperature string 32 response doesn't show a temperature increase (e.g., relative to geothermal temperature $T_G$), then the fluid flow path of a certain size is within a range of distances from casing 14, the closer boundary being defined by the sensitivity range of the temperature string 32 and the farther boundary being defined by the sensitivity range of the strain string 22. If a temperature anomaly is not detected by temperature string 32 and a pressure increase is not detected by the strain string 22, any flow of any size is at a distance outside the sensitivity range of strain string 22 and temperature string 32. The use of additional tracing methods such as oxygen activation can further facilitate determining the boundaries on an area in which flow is occurring. Tracers in the flow, such as those created by a pulsed-neutron logging tool that causes oxygen activation, can determine fluid velocity but not volumetric or mass rates. Using this information along with temperature-calculated mass flow rate can give an indication of either flow size or distance from casing 14.

Figure 17:
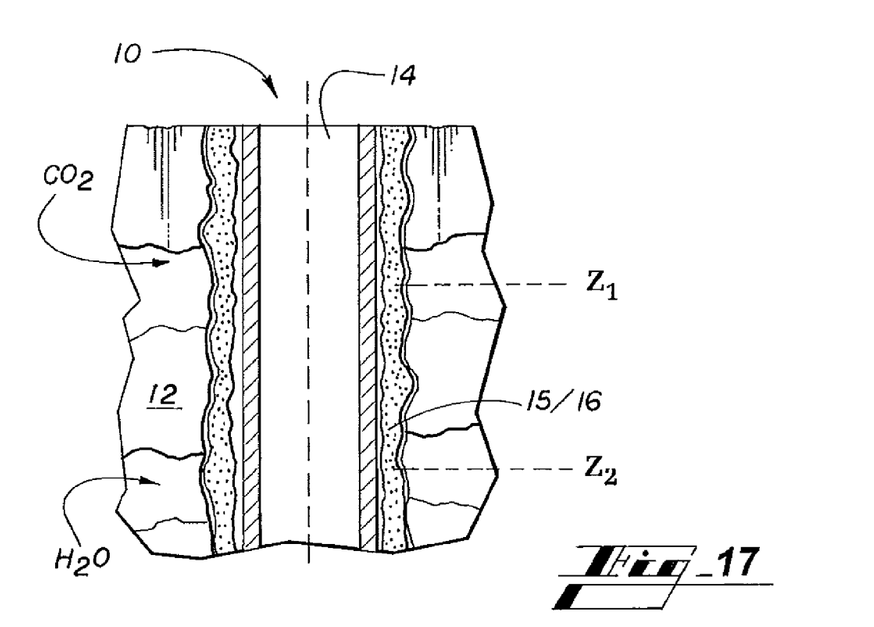
FIG. 17 is a partial cross-sectional view of the casing of FIG. 2 including permeable beds of carbon dioxide and water.
Figure 18:
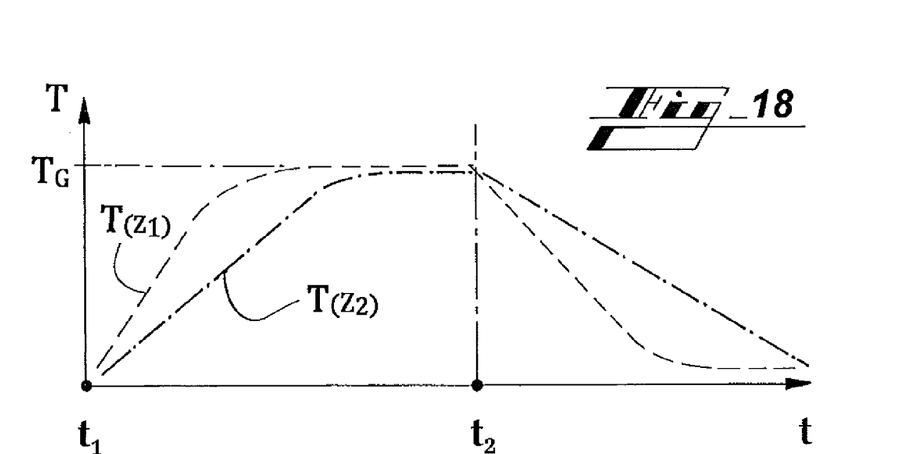
FIG. 18 is a graphical illustration of temperature at different points along the length of the casing of FIG. 17 over time.

Referring to FIGS. 17 and 18, monitoring system 20 can differentiate between fluids that have different effects on the rate of temperature change of casing 14. For example, carbon dioxide ($CO_2$) and water ($H_2O$) affect the rate of temperature change differently. According to an exemplary method, temperature change is monitored after beginning and ending injection operations. Here, injection fluids are colder than formation 12. Referring to FIG. 18, when well injection begins (time $t_2$), well 10 cools down. When well injection is stopped (time $t_1$) warmback of well 10 occurs. During the life of injector 2 (see FIG. 1), injector 2 will be turned off many times for scheduled or unscheduled maintenance. Every such cycle produces a perturbation of the temperature of well 10. The local rate of temperature change of casing 14 is a function of the concentration of the fluid surrounding casing 14 in the area, such as beds of carbon dioxide $CO_2$ and water $H_2O$ shown in FIG. 17. As such, monitoring the rate of temperature change according to this method provides an indication of what fluids are located at certain positions along casing 14. Measurements taken over time can be used to monitor migration of such fluids and the rate of migration.

Monitoring system 20 can measure axial strain along casing 14, which is related to reservoir compaction/dilation. For example, when injecting carbon dioxide, there is generally reservoir dilation. Monitoring system 20 can be used to quantify this and calibrate geomechanical models, which indicate that injected carbon dioxide is going where intended.

Cement Quality Analysis

Referring to FIGS. 19-22, monitoring system 20 can further be used to determine the quality and effectiveness of cement 16. Strain strings 22 and temperature string 32 can be used individually or in combination to continually or periodically monitor the quality of cement 16 without running a tool or other well intervention. For example, the curing process is monitored and the integrity of the cement 16 is monitored after cement 16 has cured. Objectives of cement 16 placement monitoring include detecting the top of cement 90 and determining the quality of the cementation (zonal isolation).

Figure 20:
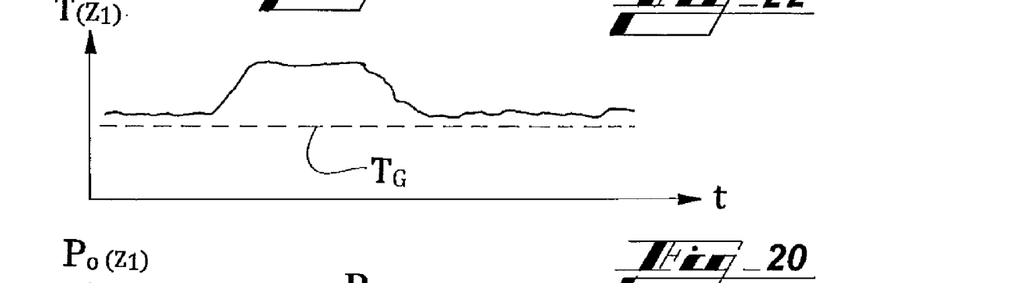
FIGS. 20 and 21 are graphical illustrations of temperature and external pressure at a point on the casing of FIG. 19 during an exemplary curing process.
Figure 21:
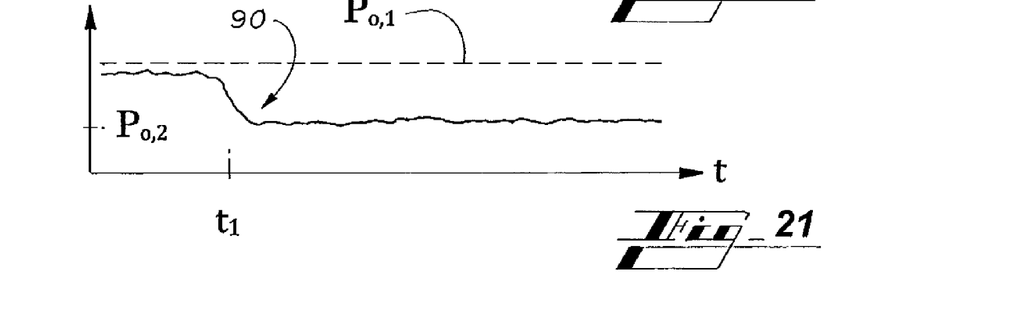

Referring to FIG. 20, cement 16 cures by an exothermic reaction where the heat given off and rise in temperature is substantially proportional to the volume of cement 16 curing. In addition to the rise in temperature that accompanies cement curing, conventional cements shrink as they hydrate. Referring to FIG. 21, this shrinkage and hydration results in a decrease in external pressure $P_o$ applied to casing 14. Initially, liquid cement 16 applies hydrostatic pressure $P_{o,1}$ to casing 14. As liquid cement 16 cures, the pressure applied by cement 16 permanently changes and the pressure $P_{o,2}$ applied by cured cement 16 is approximately the fluid pressure applied by fluids in formation 12. The early time in FIG. 21 shows the external pressure $P_o$ at a point $z_1$ on casing 14 when cement 16 was pumped. Late time in FIG. 21 shows external pressure $P_o$ at point $z_1$ on casing 14 after cement 16 has cured and has effectively lowered the external pressure $P_o$ applied to casing 14 at point $z_1$.

Figure 22:
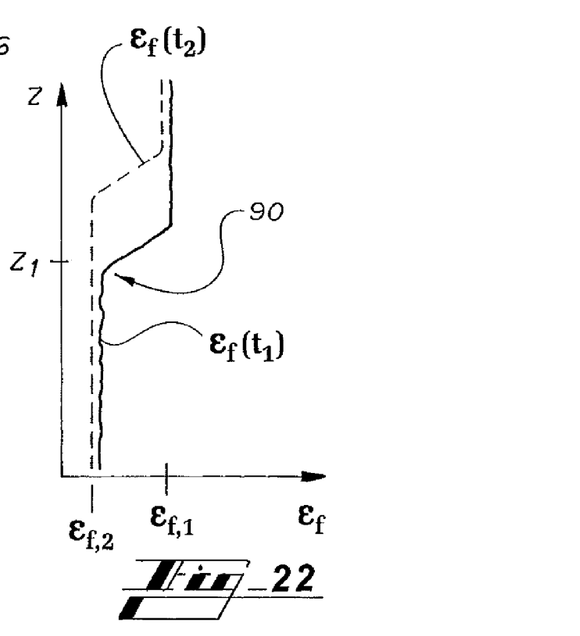
FIG. 22 is a graphical illustration of external pressure at different times along the length of the casing of FIG. 19.

It should be understood that monitoring system 20 gathers data for multiple points having different depths and azimuth angles (not shown) and therefore provides complete coverage of casing 14 and any variations in cured cement 16. FIG. 22 illustrates the response of monitoring system 20 to partially cured cement 16 along the length of casing 14. Top of cement 90 reaches point $z_1$ at time $t_1$. In the uncured or poorly cured portions of cement 16, the hydrostatic pressure in annulus 15 has not been reduced by hydration and shrinkage of cement 16. The response of monitoring system 20 differentiates between cured and uncured cement 16 and can monitor the position of the top of cement 90 during the curing process. Cured cement is represented by fiber strain $\epsilon_{f,2}$ and uncured cement is represented by fiber strain $\epsilon_{f,1}$.

Figure 19:
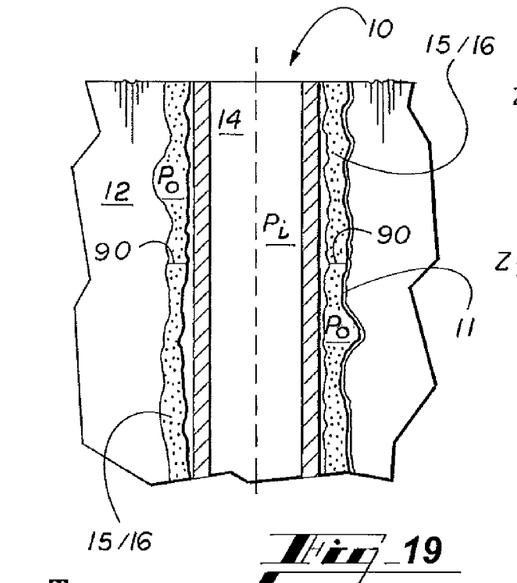
FIG. 19 is a partial cross-sectional view of the casing of FIG. 2 where cement pumped into an annulus is partially cured.

In the case of cement 16 curing in annulus 15 bounded by concentric casings 14a, 14b, strain strings 22 on each of concentric casings 14a, 14b observe hoop strain changes in opposite directions due to the change in annulus 15 pressure. Where the curing cement 16 is outside casing 14, the external pressure decreases. Where the curing cement 16 is internal to casing 14, the internal pressure decreases.

The temperature history from the temperature string 32 can be combined with other logs such as caliper logs to determine the cross sectional area of a channel or microannulus or otherwise the quality of cement 16. For example, the temperature increase during curing can be used to determine the volume of cement placed and the volume can then be compared was expected to be used based on a caliper log or another determination of hole volume as a function of depth. Volume of cement 16 is determined based on the temperature change, the heat capacities of the various components, and the heat transfer characteristics of formation 12, cement 16, and casing 14. When the cement volume estimated from the temperature substantially equals that from the caliper, there are no large voids. When the temperature-estimated volume is less than the caliper-calculated volume, there is indication of a void, channel, or microannulus. Knowledge of the size (cross section) of the channel or microannulus is useful for estimating "leakage rate" when monitoring injection or production processes or other logging measurements such as water flow log which give a velocity.

The above-described embodiments are merely exemplary illustrations of implementations set forth for a clear understanding of the teachings and associated principles. Variations, modifications, and combinations may be made to the above-described embodiments without departing from the scope of the claims. All such variations, modifications, and combinations are included herein by the scope of this disclosure and the following claims.

The invention claimed is:

1. A method for analyzing cement in the annulus of a well during a downhole operation, comprising:
    controlling internal pressure of a casing of the well;
    measuring internal pressure of the casing;
    measuring strain of the casing with a system comprising at least one string of interconnected sensors that is arranged such that the sensors are distributed along a length and the circumference of the casing, the measured strain being a function of internal pressure; and
    determining the quality of the cement as a function of strain of the casing and internal pressure, wherein determining the quality comprises determining the proportionality of strain of the casing to internal pressure so as to establish a line of proportionality;
    further comprising differentiating between the mechanical breakdown of cement and the initiation or propagation of a fracture in the formation, respectively, by identifying whether the strain of the casing deviates from the line of proportionality or moves up and back down the line of proportionality.

2. The method of claim 1 further comprising identifying where the strain of the casing deviates from a line of proportionality.

3. The method of claim 1 wherein the strain function is $$\varepsilon_h \approx \frac{(P_i - P_o)D}{2wE},$$

$\epsilon_h$ is hoop strain, $P_i$ is internal pressure, $P_o$ is external pressure, D is diameter, E is Young's modulus, and w is thickness.

4. The method of claim 1, further comprising determining mechanical properties of a formation.

5. The method of claim 1 wherein the at least one string winds helically along the length and about the circumference of the casing.

6. The method of claim 1 wherein measuring strain of the casing comprises measuring at least two independent measurements of strain.

7. The method of claim 6 where the at least one string is arranged with at least two wrap angles.

8. The method of claim 7 wherein the at least two independent measurements of strain correspond to the at least two wrap angles.

* * * * *